United States Patent [19]

Alexander

[11] Patent Number: 5,342,427
[45] Date of Patent: Aug. 30, 1994

[54] APPARATUS FOR CULLET PREHEATING AND POLLUTING EMISSION REDUCTION IN THE GLASS MANUFACTURING PROCESS

[75] Inventor: Jeffery C. Alexander, Newbury, Mass.

[73] Assignee: Edmeston AB, Vastra Frolunda, Sweden

[21] Appl. No.: 53,695

[22] Filed: Apr. 29, 1993

Related U.S. Application Data

[62] Division of Ser. No. 998,036, Dec. 29, 1992.

[51] Int. Cl.⁵ .................................................. C03B 3/02
[52] U.S. Cl. ............................................. 65/27; 65/28; 65/335; 65/168; 96/15; 96/55; 165/921; 34/79
[58] Field of Search ...................... 65/27, 28, 335, 168; 55/99, 474; 165/921; 34/79

[56] References Cited

U.S. PATENT DOCUMENTS

| | | |
|---|---|---|
| 4,144,359 | 3/1979 | Zahedi et al. . |
| 4,149,858 | 4/1979 | Noachk et al. . |
| 4,306,899 | 12/1981 | Richards . |
| 4,308,036 | 12/1981 | Zahedi et al. . |
| 4,338,112 | 7/1982 | Propster . |
| 4,349,367 | 9/1982 | Krumwiede . |
| 4,374,652 | 2/1983 | Zahedi et al. . |
| 4,505,723 | 3/1985 | Zahedi et al. . |
| 4,542,000 | 9/1985 | Alexander et al. . |
| 4,668,489 | 5/1987 | Alexander et al. . |
| 4,940,478 | 7/1990 | Naber et al. . |
| 5,243,621 | 9/1993 | McNeill ............................. 65/335 |

FOREIGN PATENT DOCUMENTS 2038200  7/1980  United Kingdom .

*Primary Examiner*—W. Gary Jones
*Assistant Examiner*—John Hoffmann
*Attorney, Agent, or Firm*—Burns, Doane, Swecker & Mathis

[57] ABSTRACT

A apparatus for simultaneously preheating cullet and removing pollutants from glass furnace gases is disclosed. Raw moist cullet having fine glass dust material and other impurities adhered to its surface is heated by furnace gases which remove the moisture and the impurities by entrainment. The dry, clean cullet is then electrically charged and used to filter the exhaust gases which have been electrostatically charged.

11 Claims, 3 Drawing Sheets

APPARATUS FOR CULLET PREHEATING AND POLLUTING EMISSION REDUCTION IN THE GLASS MANUFACTURING PROCESS

This application is a division, of application Ser. No. 07/998,036, filed Dec. 29, 1992.

BACKGROUND OF THE INVENTION

1. Field of the Invention

The present invention lies in the art of glass manufacture. More particularly, the invention concerns the processing of cullet which is fed to a glass melting furnace along with other raw materials. In particular, the invention is directed to a method and apparatus for preparing cullet for use in an electrostatic bed filter to remove pollutants from the melting furnace exhaust gases.

2. Description of the Prior Art

Glass manufacture involves the mixing of various batch ingredients, generally including silica sand, dry powders, granular oxides, carbonates, and other raw materials (depending on the desired glass type) and heating them to a temperature of about 1500° C. where they become molten and acquire a homogeneous nature. Substantial quantities of heat are require for the melting process, generally supplied by combustion of fossil fuels. Because of the relatively poor heat transfer from the hot combustion gases to the pool of molten glass, exhaust gas temperatures from the process are usually quite high in spite of various types of heat recovery equipment employed. As well, pollutants of various types are emitted from the melting process along with the exhaust gases.

Cullet, that is, broken pieces of glass, is added to the other batch ingredients and charged to the melting furnace. A certain minimum proportion of the total batch is required to be cullet in order to provide proper melting characteristics, generally in the range of 10-20% by weight. Cullet normally used for this purpose is generated within the glass factory, either from product breakage during the manufacturing process, or from dumping of molten glass during product changes.

Recent emphasis on waste recycling has resulted in the collection of large quantities of what is called ecological cullet. This is generally glass bottles returned to recycling centers. With proper processing such as sorting by color, removing foreign substances and crushing to smaller sized pieces, ecological cullet can be made suitable for remelting into new glass. Currently there are a number of glass factories set up with glass melting furnaces where some 80-90% of the batch feed material is ecological cullet.

When used in these quantities, the possibility of preheating cullet with waste exhaust gases from the furnace becomes economically attractive and equipment for such purpose is commercially available. See, Zippe, "Economics of Cullet Preheating", Glass International, June 1992.

One such type of equipment potentially useful in this role is an electrostatic granular bed filter (EGB filter). EGB filters employ a bed of electrically charged granules. Exhaust gases containing particulate pollution are electrostatically charged and contacted with the granular bed. The electrostatically charged particles in the exhaust gases are attracted to and retained on the electrically charged granular bed.

U.S. Pat. No. 4,338,113, incorporated herein by reference, discloses methods for utilizing EGB filter technology for air pollution reduction from glass furnaces. However, this patent provides no teaching of a workable system for replacing the granules in the EGB filter with cullet.

The simple substitution of cullet for the widely used silica-based granules in an EGB filter results in several operational problems which render the system ineffective and inoperative. First, cullet is generally wet either from washing in the waste recycling process or from storage in open outside locations. Wet granules in an EGB filter would present an electrical short circuit and prevent the necessary application of high voltage to the bed.

Second, the heat transfer resulting from direct contact of the hot exhaust gases and the cullet is quite good. As a result, the exhaust gases are very effectively cooled by the cold cullet as it is first contacted by the gases. Continued heat transfer cools the gases to below their acid dew point temperature, at which point an acid mist would be formed which would in turn result in excessive equipment corrosion.

Third, as cullet is handled mechanically, the glass is subject to breakage and formation of substantial quantities of fine glass dust. When exhaust gases are passed through the cullet in the EGB filter, this glass dust would become entrained in the gases and exit the filter as dust emissions.

Hence, there remains a need in the art for a method and apparatus for preheating cullet and simultaneously using the cullet to remove pollutants from melting furnace exhaust gases.

SUMMARY OF THE INVENTION

It is accordingly an object of the invention to provide a method and apparatus for the preheating of cullet prior to feeding the cullet to the glass furnace.

It is another object of the invention to provide a method and apparatus, as above, which simultaneously provides for reducing particulate pollution emissions from glass furnace exhaust gases.

It is yet another object of the invention to provide a method and apparatus, as above, which renders the cullet suitable for use as a bed in an electrostatic filter.

These objects are achieved by a method for reducing particulate pollution emission from glass furnace exhaust gases, which includes the steps of (a) providing a first moving bed of raw cullet, the raw cullet having impurities adhered to its surface including moisture and fine glass dust material; (b) passing glass furnace exhaust gases through the first moving bed, the exhaust gases containing particulate pollution and condensible acid-generating materials, the velocity of the exhaust gases through the first moving bed being such that the exhaust gases are cooled to a temperature above their acid dew point; (c) entraining at least a portion of the moisture and fine glass dust material from the raw cullet into the glass furnace exhaust gases passing through the first moving bed; (d) simultaneously heating the first moving bed to a temperature above the acid dew point of the exhaust gases, thereby forming cleaned, preheated cullet; (e) electrostatically ionizing the particulate pollution and dust material in the cooled exhaust gases after they exit the first moving bed; (f) forming a second moving bed of cullet with the cleaned, preheated cullet from the first moving bed; (g) electrically polarizing the second moving bed of cullet; (h) passing the cooled exhaust gases through the electrically polarized second moving bed and depositing on the second moving bed at least a portion of the electrostatically ionized particulate pollution and fine glass dust material in the cooled exhaust gases, thereby forming cleaned exhaust gases; (i) discharging the cleaned exhaust gases; and (j) discharging the second bed of cullet, including the deposited particulate pollution and dust material, to the glass melting furnace.

The objects of the invention are also achieved by an apparatus for reducing particulate pollution emissions from glass furnace exhaust gases, which includes (a) a confinement for a first moving bed of raw cullet having impurities adhered to its surface, including moisture and fine glass dust material; (b) means for passing hot glass furnace exhaust gases through the first moving bed, the exhaust gases containing particulate pollution and condensible acid-generating materials, the velocity of the exhaust gases through the first bed being such that the exhaust gases are cooled to a temperature above their acid dew point, wherein at least a portion of the moisture and fine glass dust material from the cullet is entrained in the exhaust gases passing through the first moving bed and wherein the first moving bed is heated by the exhaust gases to a temperature above the acid dew point of the exhaust gases; (c) an electrostatic ionizer for electrostatically ionizing the dust particles in the cooled exhaust gases after they exit the first moving bed; (d) a confinement for a second moving bed formed with the cleaned, preheated cullet from the first moving bed; (e) an electric polarizer for electrically polarizing the second moving bed of cullet; (f) means for passing the cooled exhaust gases through the electrically polarized second moving bed and depositing at least a portion of the electrostatically ionized particulate pollution and dust material in the cooled exhaust gases onto the second bed, thereby forming cleaned exhaust gases; (g) an outlet for discharging the cleaned exhaust gases; and (h) an outlet for discharging the second bed of cullet, including the deposited particulate pollution and dust material, to the glass melting furnace.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

Figure 1:
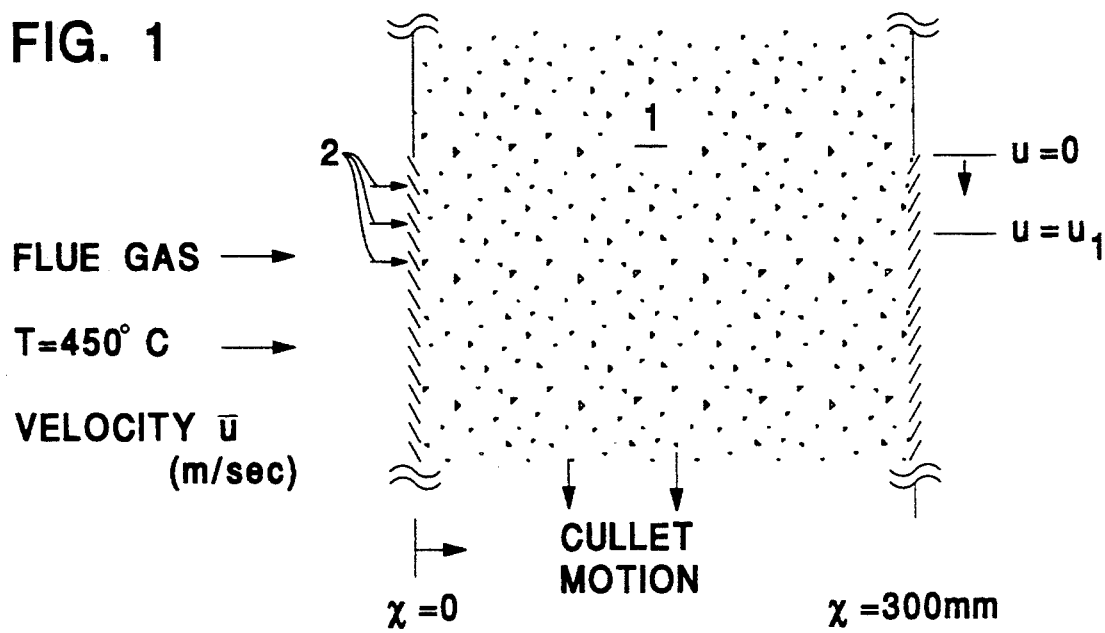
FIG. 1 illustrates a vertically downward moving cullet bed with horizontal gas flow therethrough.
Figure 2:
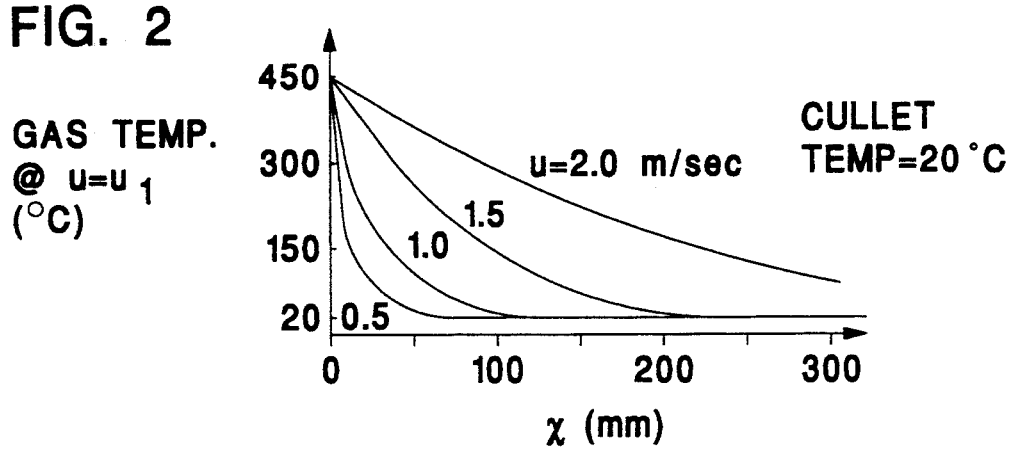
FIG. 2 is a graph of exhaust gas temperature vs. cullet bed thickness for a variety of gas velocities and a cullet bed temperature of 20° C.
Figure 3:
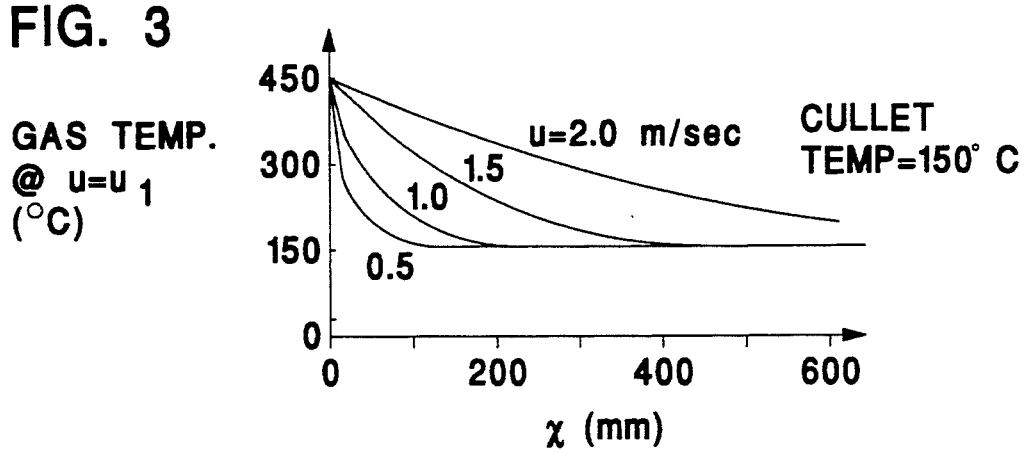
FIG. 3 is a graph of exhaust gas temperature vs. cullet bed thickness for a variety of gas velocities and a cullet bed temperature of 150° C.

The present invention is based in part on an understanding of the heat transfer characteristics of the flow of exhaust gases through a cullet bed. The heat transfer between cold cullet and hot exhaust gases is illustrated in FIG. 1, wherein a vertically downward moving bed of cullet 1 with horizontal gas flow through it is represented by arrows 2. For all vertical positions y above $y=0$, the exhaust gas is prevented from flowing through the cullet bed by a solid sheet of metal. For all positions below $y=0$, exhaust gas is allowed to flow through the cullet bed. Thus, for some position $y=y_1$, the exhaust gas will have a temperature profile through the bed as a function of the horizontal position coordinate x. Typical profiles are shown in the plots of FIGS. 2 and 3. Here exhaust gas temperature is plotted versus horizontal position x in the bed, with the exhaust gas superficial velocity U incident on the bed as a parameter. The two plots are for two different cullet inlet temperatures, namely 20° C. and 150° C.

As seen in FIG. 2, at low gas velocities ($U=0.5$ m/sec), the gas temperature drops from its incident value (in this case 450° C.) to the incident cullet temperature (in this case 20° C.) in a very short distance, i.e., less than 50 mm. It should be noted that the acid dew point of the exhaust gases is typically about 150° C., so the gas is cooled to a temperature below its acid dew point and acid condensation would occur. As gas velocity is increased, the gas maintains its temperature for greater penetration into the bed. However, if the bed is thick enough, the gas will always be cooled to below the dew point.

Two design alternatives which can assure that the gas will not be cooled below its dew point are first, maintaining the inlet cullet temperature at 150° C. or above, thereby gas temperature will always remain above 150° C., as shown in FIG. 3. This option then allows full latitude in the design of the bed as a filter, specially allowing free choice of gas velocities and bed thicknesses.

Second, the gas velocity can be increased and the bed thickness can be decreased to the required values. For example, if the velocity is at 2.0 m/sec and the bed thickness is less than 200 mm, the gas temperature will always be above 150° C. Generally, this approach will result in designs which cannot be effective filters. Optimum filter design calls for velocities less than 0.4 m/sec and thicknesses greater than 500 mm. In addition, high gas velocities would affect cullet motion and practical filter operation would not be possible.

Concerning the problem of glass dust formation in the cullet, it is certainly possible to simply use mechanical separation apparatus, such as vibrating screens, to remove the dust from the cullet, but these have been found unsatisfactory for two reasons. Fine material cannot be effectively separated from the wet cullet because the water acts as an adhesive. For example, even though substantial fine material can be removed by a vibrating screen, upon subsequent drying, additional fine material will be released. Second, any subsequent mechanical handling which involves the impact of the cullet onto hard surfaces will result in additional breakage and fines formation. Therefore, it would be useful for the cullet to be dried and cleansed of fine material immediately before entry to the filter, with no intermediate transport steps taken.

The present invention provides a solution to the problem of providing clean, preheated cullet. Cullet can be delivered to the apparatus of the invention wet, loaded with glass dust fine material, and at ambient temperatures (about 20° C.). Since it is not possible to design an effective filter utilizing this material, the material must go through a preconditioning step. One of the aspects of the invention is the unique combination of this preconditioning step with an effective filter design.

The preconditioning step employs a bed of cullet sufficiently thin coupled with gas flow at high enough velocity that cooling of the exhaust gases to their acid dew point does not occur. Since this cullet bed is not required to be a filter, it does not matter if the cullet is wet, and the cullet will be dried by the hot gas. Also, the high gas velocity in this bed serves to remove the glass dust material, freed during drying of the cullet, by blowing it out of the bed. Further, the vertical height of the bed is chosen so that the cullet is heated to a temperature above the acid dew point of the gas, so that its subsequent use in an electrostatic filtration bed is allowed. The cullet flows from the preconditioning bed to a filtration bed in a gentle fashion. In this regard, the preconditioning bed and the filtration bed are advantageous contiguous so that there is no free fall impact onto hard surfaces, and no further glass dust formation takes place.

Figure 4:
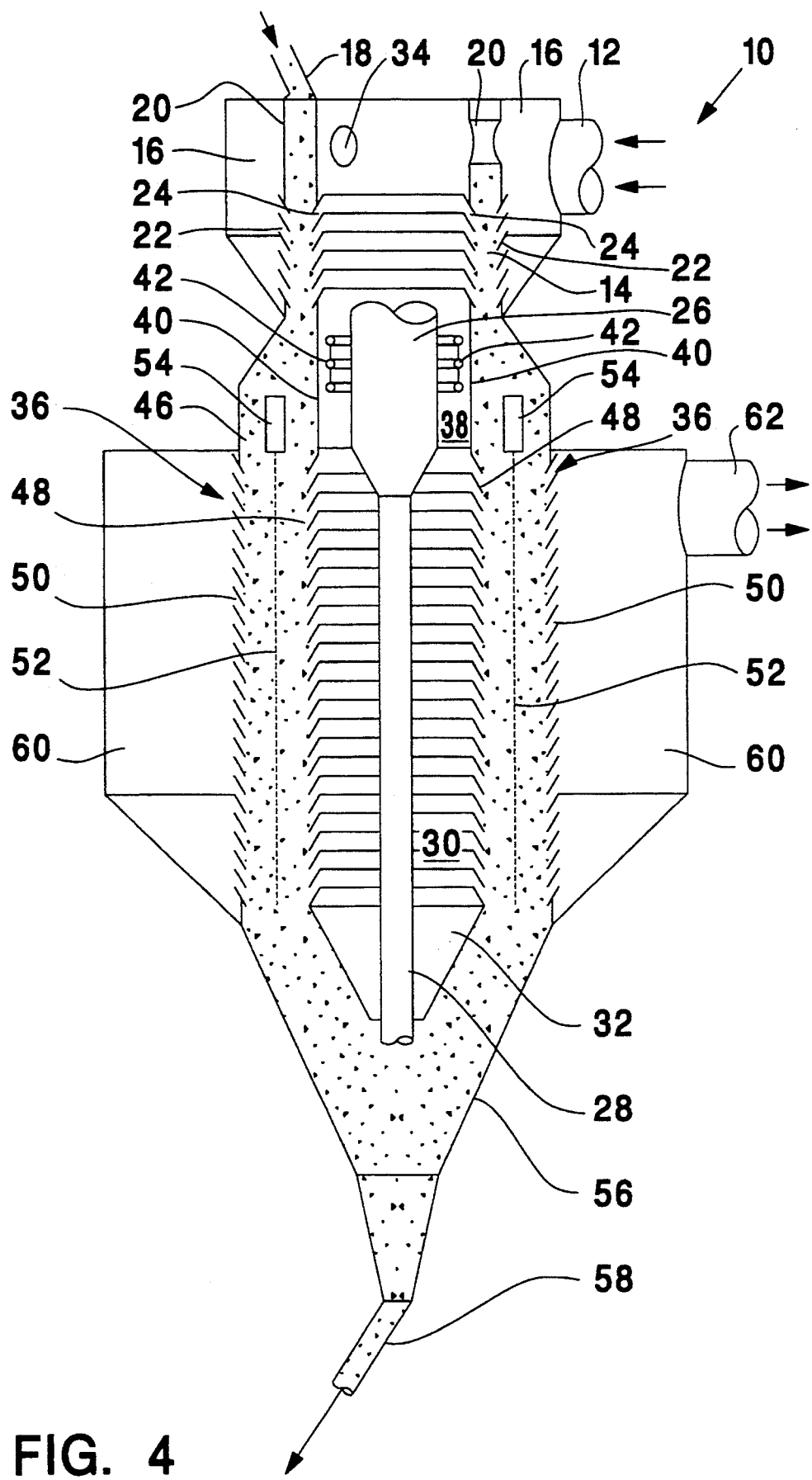
FIG. 4 is a side elevation view of one embodiment of the cullet preheating apparatus of the invention.

FIG. 4 illustrates a first preferred embodiment of the apparatus of the invention. The apparatus, generally indicated by the number 10, is a cylindrically symmetric module, but other shapes can be used depending on the specific application. Hot exhaust gases enter the module through inlet pipe 12 and are distributed around the circumference of the preconditioning bed 14 by gas plenum 16. Cullet fills the preconditioning bed 14 through one or more infeed pipes 18 and distribution hopper 20. The preconditioning bed 14 is a confinement formed by concentric conduits having apertures or slots therein, for example, outer louvers 22 and inner louvers 24. Gases pass through the cullet and in the process, the cullet is dried and preheated. The gas velocity and thickness of the bed 14 are chosen so that the exhaust gases are not cooled to below their acid dew point. The actual acid dew point is of course a function of the acid composition in the exhaust gases. In general, the acid dew point is about 150° C., but may vary from 100°–190° C. Generally, the gas velocity falls in the range of 0.5–3.0 m/sec, usually 1.0–2.5 m/sec and is typically in the range of 1.5–2.0 m/sec. The bed thickness is generally between about 50 and 300 mm, typically between about 100 and 200 mm.

The high velocity gas in the bed also serves to remove fine material from the cullet. After the cullet is dried and the fines are released, the gas velocity is sufficient to blow the fines through the bed. Fines exit the bed through inner louvers 24. The majority of the fines fall into the collection cylinder 26 where they fall by gravity to the bottom of the module 10 through pipe 28 and are added to the hot cullet exiting the module. Some of the fines escape the collection cylinder 26, but most of these will fall through the inner region 30 of the module 10 into the inner conical hopper 32 where they are discharged by gravity into the hot cullet exiting the module 10.

Bypass ducts and dampers 34 allow some of the exhaust gas to bypass the preconditioning bed. These dampers allow adjustment of the volume of gas which bypasses the preconditioning bed, and in this way, the gas velocity in the preconditioning bed can be controlled. This is important because excessive velocity in the preconditioning bed would cause larger cullet pieces to be blown out of the bed, while too low of a velocity would not effectively blow out the fines and/or would result in the exhaust gases being cooled to below their acid dew point. Only one bypass duct/damper 34 is necessary, but a plurality would be preferred to better distribute the gas flow around the circumference of the bed.

The vertical height of the preconditioning bed 14 is chosen so that the cullet will be adequately preheated to above the gas acid dew point so that the cullet can be subsequently used in the electrostatic cullet bed filter (ECB filter) 36. This is accomplished by providing a cullet bed flow velocity and cullet bed height such that adequate residence time of cullet in the preconditioning bed is achieved. Generally the cullet residence time is between 1 and 50 minutes, desirably between 5 and 30 minutes and preferably between 10 and 20 minutes.

Gases exiting the preconditioning bed 14 are directed through the annular space 38 between the collection cylinder 26 and the ionizer cylinder 40. Both of these cylinders 26 and 40 are electrically grounded and act as anode electrodes for the ionizer. The ionizer discharge cathode electrode 42 is located concentrically in the annular space 38 and is supported by ceramic insulator bushings (not shown). The cathode electrode 42 is connected to a high voltage DC power supply (not shown) and forms a corona discharge in the annular space 38. As exhaust gases pass through the annular space 38, the entrained pollutant dust particles are given an electrostatic charge.

Exhaust gases are next directed to the ECB filter 36 which is formed by cullet filling the space 46 between a confinement formed by concentric conduits having apertures or slots, such as the inner louvers 48 and outer louvers 50, both of which are electrically grounded. In this embodiment, the ECB filter 36 and the preconditioning bed 14 are contiguous. This arrangement is advantageous in that it eliminates free fall of cullet from the preconditioning bed 14 to the EGB filter 36.

A high voltage electrode 52 is located concentrically between the louvers 48, 50 and is supported by ceramic insulator bushings 54. The electrode is perforated to allow exhaust gas to pass through it.

The ECB filter 36 is designed for substantially lower gas velocity and substantially greater bed thickness than the preconditioning bed. Generally, the velocity will be from about 0.1 to 0.5 m/sec, and typically 0.2–0.4 m/sec. The thickness will be generally from about 400 to 1000 mm, and preferably from about 500 to 750 mm. Cullet flows through the ECB filter from the preconditioning bed and is discharged through the bottom hopper 56 to pipe 58. The flow rate is of such character that little or no generation of glass fines occurs. Generally, this is brought about by providing a sufficiently slow rate of movement of the cullet through the first and second beds. Cullet flow rate through the first moving bed is such that free fall of cullet, and hence generation of fines is avoided. The cullet flow velocity in the second bed is much lower than through the first bed.

The cullet temperature at its entry to the ECB filter 36 is above the acid dew point of the exhaust gas (e.g., 150° C.), from its exposure to hot exhaust gases in the preconditioning bed. The cullet exiting temperature depends upon the cullet throughput and the exhaust gas heat content into the module 10, but will typically be in the range of from about 300° to about 450° C.

The electrode 52 in the bed is connected to a high voltage power supply (not shown) and thus polarizes the cullet pieces in the bed. The polarized cullet then attracts the electrostatically charged pollutant dust particles from the gas which become attached to the cullet pieces. Cleaned gas collects in outlet plenum 60 and exits the module through pipe 62.

The apparatus as described above is capable of pretreating raw cullet comprising up to 100% ecological cullet. In general, the cullet, whether from a glass factory source or ecological sources, should have an average size of between about 1.0 mm and 50 mm, desirably between about 2 mm and 20 mm and preferably between about 4 mm and 10 mm. The cullet size will depend on a number of factors including the cullet type, desired throughout in the apparatus, and desired cullet flow rate.

Figure 5:
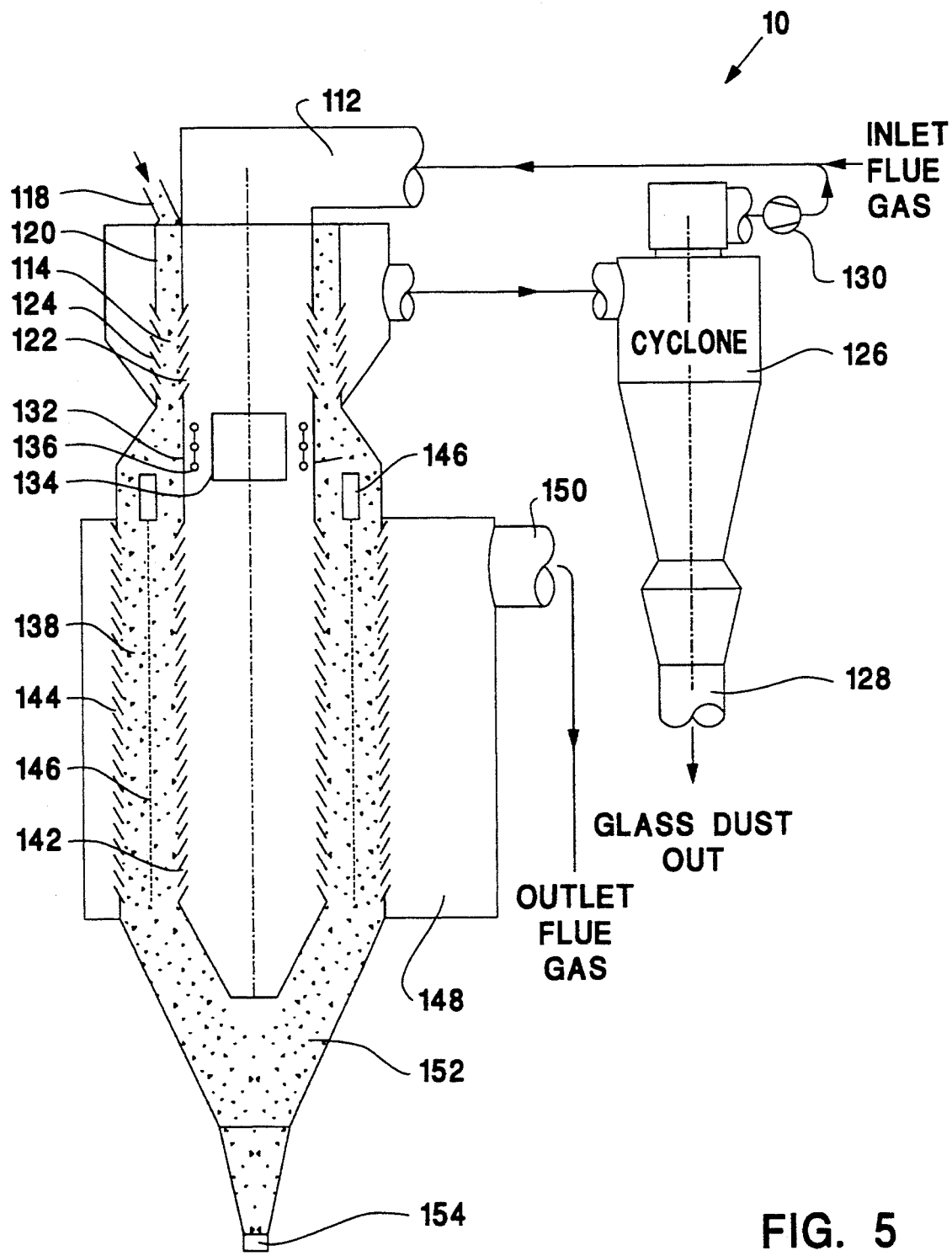
FIG. 5 is a side elevation view of a second embodiment of the apparatus of the invention.

FIG. 5 illustrates a second embodiment of the apparatus of the invention. This second embodiment differs from that of FIG. 4 in the manner in which glass fines are collected from the exhaust gases and in the routing of the exhaust gases in the precondition bed. The apparatus of FIG. 5, generally indicated by the number 110, is a cylindrically symmetric module, as in the embodiment of FIG. 4, but again, other shapes can be used depending on the specific application. Hot exhaust gases enter the module through inlet pipe 112. Cullet fills the preconditioning bed 114 through infeed pipe or pipes 118 and distribution hopper 120. The preconditioning bed 114 is formed by a confinement such as concentric conduits having apertures or slots therein, for example inner louvers 122 and outer louvers 124.

A portion of the inlet exhaust gases pass through the cullet in the preconditioning bed and in the process, the cullet is dried and preheated. The same design criteria for the preconditioning bed of FIG. 4 apply for this embodiment. The high gas velocity in the bed also serves to remove fine material from the cullet. Fines exit the bed through outer louvers 124 and are conveyed out of the module with the exiting exhaust gases. These exiting exhaust gases are then passed through a conventional mechanical dust collector such as a cyclone 126 where the glass fines are separated from the gas and discharged through pipe 128. A fan 130 provides the necessary underpressure to draw the exhaust gases through the preconditioning bed 114 and the cyclone 126. Gases then are directed back to and mixed with the inlet gases.

The hot gases which are not drawn through the preconditioning bed 114 pass through the ionizer region comprising outer anode cylinder 132, inner anode cylinder 134, and cathode electrode 136. The ionizer function is the same as in the embodiment of FIG. 4.

Gases are then directed to the ECB filter 138 which is formed by cullet filling the annular space 140 formed by a confinement as described in the first embodiment, for example, inner louvers 142, and outer louvers 144, both of which are electrically grounded. A high voltage electrode 146 is located concentrically between the louvers 142, 144 and is supported by ceramic insulators bushings 146. The electrode is perforated to allow gas to pass through it. The function and design of the ECB filter 138 is the same as in the first embodiment.

Cleaned gas collects in outlet plenum 148 and exists the module through pipe 150. Cullet flows through the preconditioning bed and is discharged through the bottom hopper 152 to pipe 154

Although the present invention has been described in connection with preferred embodiments of the invention, it will be appreciated by those skilled in the art that additions, substitutions, modifications and deletions not specifically described, may be made without departing from the spirit and scope of the invention as defined in the appended claims.

What is claimed is:

1. An apparatus for reducing particulate pollution emissions from glass furnace exhaust gases, comprising:
    (a) a first confinement for a first moving bed of raw cullet having impurities adhered to its surface, including moisture and fine glass dust material, said first confinement being free of a means for imposing an electrical charge;
    (b) means for passing hot glass furnace exhaust gases through the first moving bed, including an inlet for receiving said exhaust gases from a glass furnace, said inlet directing said exhaust gases directly to the first moving bed, the exhaust gases containing particulate pollution and condensible acid-generating materials, the velocity of the exhaust gases through the first bed being such that the exhaust gases are cooled to a temperature above their acid dew point, wherein at least a portion of the moisture and fine glass dust material from the cullet is entrained in the exhaust gases passing through the first moving bed and wherein the first moving bed is heated by the exhaust gases to a temperature above the acid dew point of the exhaust gases;
    (c) an electrostatic ionizer adjacent an exit from the first confinement means for electrostatically ionizing the dust particles in the cooled exhaust gases after they exit the first moving bed;
    (d) a second confinement for a second moving bed formed with the cleaned, preheated cullet from the first moving bed, said second confinement being contiguous with said first confinement means;
    (e) an electric polarizer for electrically polarizing the second bed of cullet,
    (f) means for passing the cooled exhaust gases through the electrically polarized second moving bed and depositing at least a portion of the electrostatically ionized particulate pollution and dust material in the cooled exhaust gases onto the second bed, thereby forming cleaned exhaust gases;
    (g) means defining a first outlet for discharging the cleaned exhaust gases from the apparatus; and
    (h) means defining a second outlet for discharging the second bed of cullet, including the deposited particulate pollution and dust material, to a glass melting furnace.

2. The apparatus as claimed in claim 1, wherein the first confinement is capable of supporting a bed of a thickness of from about 100 to about 400 mm.

3. The apparatus as claimed in claim 1, wherein the exhaust gas passing through the first confinement has a velocity in the first bed of from about 1.0 to about 2.0 m/sec.

4. The apparatus as claimed in claim 1, wherein the second confinement is capable of supporting a bed of a thickness of from about 500 to about 1000 mm.

5. The apparatus as claimed in claim 1, wherein the exhaust gas passing through the second confinement has a velocity in the second bed of from about 0.2 to about 0.4 m/sec.

6. The apparatus as claimed in claim 1, wherein the apparatus is capable of using recycled ecological waste glass.

7. The apparatus as claimed in claim 1, wherein the apparatus is capable of using raw cullet having an average size of from about 2 mm to about 20 mm.

8. The apparatus as claimed in claim 1, wherein the first confinement includes an annulus formed by concentrically arranged inner and outer conduits having a plurality of apertures or slots therein, and wherein said glass furnace exhaust gases pass from said outer conduit to said inner conduit via said apertures or slots.

9. The apparatus as claimed in claim 1, wherein the first confinement includes an annulus formed by concentrically arranged inner and outer conduits having a plurality of apertures or slots therein, and wherein said glass furnace exhaust pass from said inner conduit and exit through said outer conduit via said apertures or slots.

10. The apparatus as claimed in claim 9, including a dust collector connected to said outer conduit, said dust collector providing for removal of the fine glass dust particles entrained in the cooled exhaust gases exiting the first bed and including means for recycling cleaned exhaust gases exiting the dust collector to the inner conduit.

11. The apparatus as claimed in claim 10, wherein said dust collector comprises a cyclone.

* * * * *